United States Patent [19]

Arnout et al.

[11] Patent Number: 4,830,681

[45] Date of Patent: May 16, 1989

[54] OXYGEN CUTTING METHOD AND NOZZLE

[75] Inventors: Michel Arnout; Eric Dufour, both of Franconville; Roger Le Goff, Conflans-Sainte-Honorine, all of France

[73] Assignee: L'Air Liquide, Paris, France

[21] Appl. No.: 173,090

[22] Filed: Mar. 24, 1988

[30] Foreign Application Priority Data

Apr. 1, 1987 [FR] France .................... 87 04523

[51] Int. Cl.⁴ .............................. B23K 7/00
[52] U.S. Cl. ...................... 148/9 R; 266/48
[58] Field of Search ............ 148/9 R; 266/48

[56] References Cited

U.S. PATENT DOCUMENTS

| 2,094,641 | 10/1937 | Deming | 148/9 |
| 2,302,734 | 11/1942 | Babcock | 266/74 |
| 2,501,724 | 3/1950 | Hughey | 148/9.6 |

Primary Examiner—Wayland Stallard
Attorney, Agent, or Firm—Lee C. Robinson, Jr.

[57] ABSTRACT

An oxygen cutting device comprising two cutting oxygen jets conducted through passageways with a passageway therebetween for a carburizing flame ensuring a reheating at depth of the rough-cut kerf which is effected by the first cutting oxygen jet and is finished by the second cutting oxygen jet.

11 Claims, 3 Drawing Sheets

OXYGEN CUTTING METHOD AND NOZZLE

The present invention relates to the oxygen cutting of flat metal parts, in particular sheets of great thickness, slabs, etc., of the type in which the part to be cut is preheated by a plurality of heating flames extending at least ahead relative to the cutting line and then one or more cutting oxygen jets are brought into action in succession.

BACKGROUND OF THE INVENTION

In an oxygen cutting operation on a thick part, the heating flames must perform four essential functions, namely:

effectively heat the edge of the slab up to the cut-initiating temperature, supply on the surface of the part the heat required for maintaining the cutting procedure, ensure that the cutting jet has satisfactory flow properties, heat as far into the kerf as possible in order to facilitate the flow of slag.

The cutting oxygen jet must be at a sufficient flow rate to ensure the combustion of the iron and, above all, very "rigid" in order to avoid the drag effects and effectively evacuate the slag, i.e. to convert all the potential pressure energy into flow speed kinetic energy.

At the present time, the most commonly used technology in the design of cutting nozzles for great thicknesses is the double heating ring concentric with a central oxygen jet with an outer ring having a very oxidizing flame for heating the top of the slab to be oxygen cut and a heating ring located between this outer ring and the central cutting jet which has a very carburizing flame for the purpose of obtaining a long feather around the cutting jet which, entrained by the latter, enters the cutting kerf and aids the heating of the middle and bottom of the kerf.

For the oxygen jet, a nozzle termed a Laval nozzle is in most current use for obtaining a high output speed without a bursting of the jet.

However, the use of a very high-speed oxygen jet has its limits, since it may result in insufficient heat in the middle of the kerf which produces, above all when oxygen cutting in the cold state, undermining detrimental to the quality of the cut.

More recently, cutting nozzles have been proposed which have two oxygen jets for the oxygen cutting of current thicknesses, but with off-centre jets.

Further, European patent application No. 0 172 800 discloses an improvement in oxygen cutting methods which employs a supplementary oxygen jet which ensures a re-fusion at the base of the kerf and facilitates the detachment of burrs after cutting.

SUMMARY

An object of the present invention is to increase the oxygen cutting speed which is one of the determinant elements for increasing productivity in the iron and steel industry whereas the known technologies do not permit improving this factor even after optimization with gases of higher performance.

More specifically, the object of the invention is to provide another nozzle design whereby it is possible to attain cutting speeds 20% higher than those possible with presently-known equipment.

The invention comprises arranging the cutting oxygen jets in such manner as to act in a direction parallel to each other along the cutting line and effecting, by the first cutting oxygen jet, the rough cutting of a rough kerf, bringing into action between the first and second cutting jets an intermediate flame for deeply reheating said rough kerf while the second heating jet effects a finishing of the cut.

The first oxygen jet has for function to form the kerf without being concerned with the quality of the cut. The intermediate heating flame, entrained and aspirated by the two parallel oxygen jets, enters the kerf and effectively contributes to the heating in the middle and at the bottom of the kerf. The second cutting oxygen jet ensures that the first cutting oxygen jet has no excessive drag and results in a particularly smooth surface quality of the cut. In practice, the deep reheating intermediate flame is produced by a stream of fuel or oxygen-fuel with a low proportion of oxygen, which completely penetrates the kerf rough-cut by the first cutting oxygen jet and thus ensures a very effective heating in the middle and at the bottom of the kerf. This central supply of fuel plays a determinant part as concerns the speed and quality of the cutting of very thick sheets. For example, such a flame is obtained with "crylene" ® with an oxygen consumption ratio of 0.5, and 1.5 for "tetrene" ®, whereas the usual ratios are 1.8 and 3.5, respectively.

It is imperative that the flow rate be on the order of 1 to 2 cu. m/h. An excessively low flow rate of below 1 cu. m/h results in drops in performance.

The output speed of the fuel is not very important since it is the aspiration of the oxygen jets (2.2 to 2.5 mach) which entrains it to the bottom of the kerf.

This new phenomenon may be interpreted by the fact that the fuel is partly mixed with a little oxygen in the middle and at the bottom of the kerf which contributes to an effective heating, since a "soft" flame, i.e. a flame without or with very little oxygen, is inoperative in obtaining the result of the invention.

By nature, this manner of proceeding can only be employed for straight cuts or cuts at a very large radius of curvature and moreover requires an orientation of the nozzle and blowpipe relative to the axis of displacement.

Operational trials have enabled the cutting speed to be improved by 20% relative to those of the most efficient equipment known at the present time.

Comparative tests carried out with prototypes reveal the decisive importance, for increasing the cutting speed, of the supply of fuel between the two cutting oxygen jets.

According to a preferred embodiment, the second cutting jet has a cross-section larger than that of the first cutting jet.

Preferably, there is brought into action after a large frontal preheating and simultaneously with the action of the cutting jets and the intermediate flame, a supplementary plurality of heating flames arranged with a double lateral extension on each side of the cutting line.

The invention also relates to a cutting nozzle of the type comprising a plurality of heating passageways for a fuel mixture opening out in the vicinity of at least a part of the periphery of said nozzle, at least two cutting oxygen passageways opening out in parallel directions in a central part of said nozzle, wherein the outlets of all the cutting oxygen passageways are aligned on a straight longitudinal line of the nozzle with a symmetrical distribution, on each side of said longitudinal line of alignment, of the outlets of the heating passageways, and the nozzle further comprises, between two successive oxygen cutting outlets, an intermediate outlet of a passageway for a fuel.

Advantageously, the nozzle has a density of outlets of peripheral heating passageways which is higher in the vicinity of one end of the straight line of alignment of the outlets of the cutting oxygen passageways.

Preferably, the outlets of the heating passageways extend beyond a frontal peripheral zone whose general direction is substantially normal to the straight line of alignment of the outlets of the cutting oxygen passageways on each side of said straight line of alignment of the outlets of the cutting oxygen passageways, from the transverse region of the first outlet of cutting oxygen passageway at least to the outlet of the last cutting oxygen passageway.

Two successive oxygen cutting outlets are preferably spaced apart a distance of between 8 and 20 mm.

BRIEF DESCRIPTION OF THE DRAWINGS

The features and advantages of the invention will be apparent from the following description which is given by way of example with reference to the accompanying drawings, in which.

DESCRIPTION OF CERTAIN PREFERRED EMBODIMENTS

Figure 1:
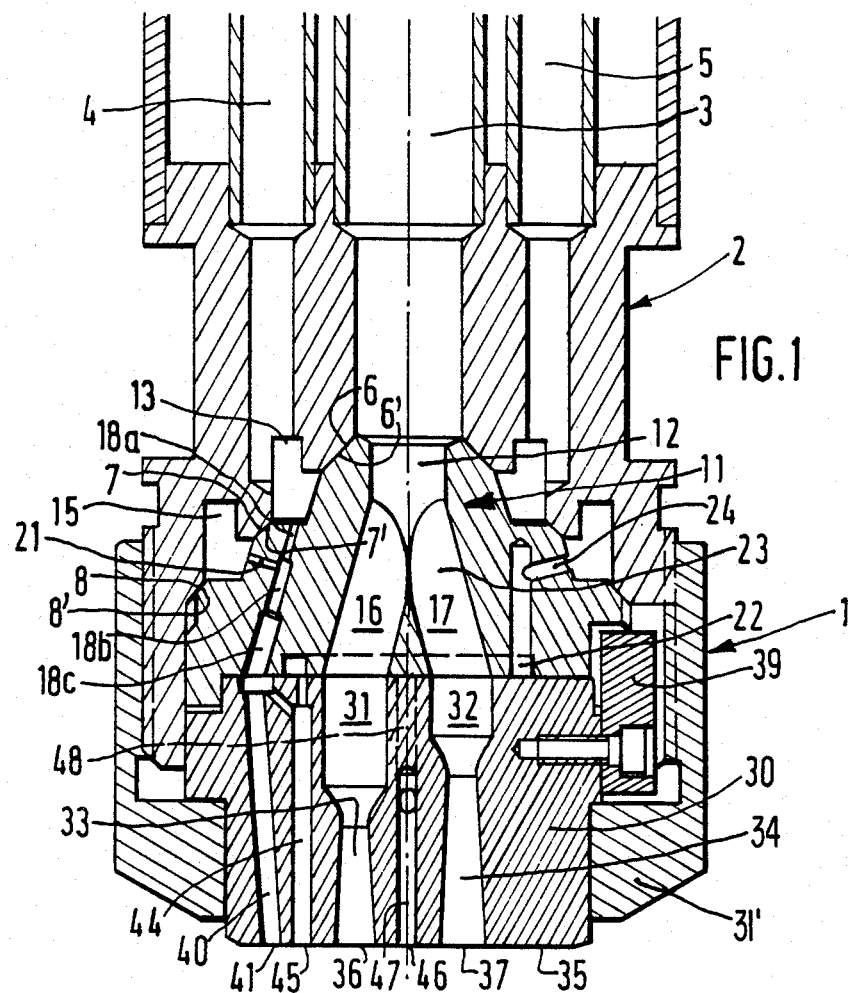
FIG. 1 is an axial sectional view of a nozzle according to the invention.
Figure 2:
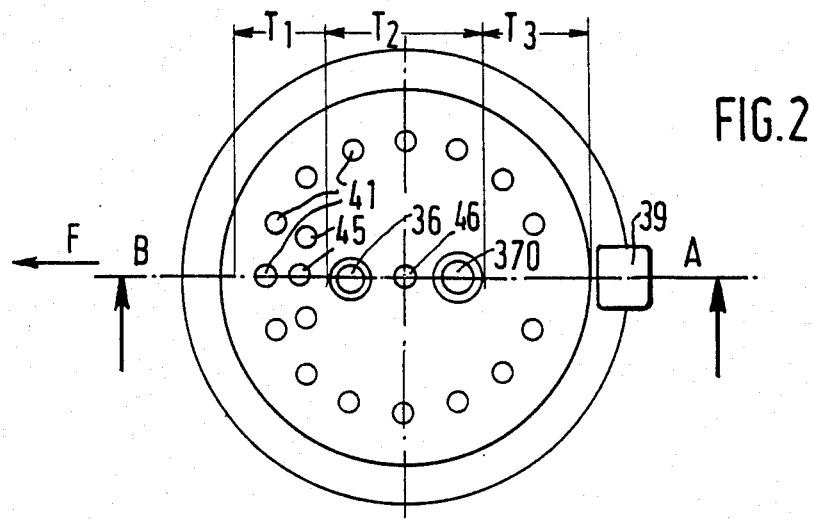
FIG. 2 is an end elevational view of the nozzle of FIG. 1.

With reference to FIGS. 1 and 2, an oxygen cutting device comprises a nozzle 1 mounted on a nozzle body 2.

The nozzle body 2 comprises different supply passageways, namely:

a central cutting oxygen passageway 3 whose relatively high pressure is on the order of 8 to 20 bars;

two heating oxygen passageways 4 and 5 disposed diametrically on opposite sides of the axial passageway 3;

two heating fuel passageways (not shown) in a position offset at 90° relative to the axis of the nozzle body 2.

The nozzle body 2 has at its free end a plurality of frustoconical surfaces constituting connectors 6, 7 and 8 against which cooperative surfaces 6', 7' and 8' of a nozzle head 11 come to bear.

The cooperative surfaces 6 and 6' serve to ensure the seal between the axial cutting oxygen passageway in the nozzle body 2 and the start of an axial passageway 12 in the nozzle head 11.

The frustoconical sealing surfaces 7 and 7' cooperating with the sealing surfaces 6 and 6' serve to ensure the seal between a transverse annular passageway 13 onto which open the two heating oxygen passageways 4 and 5.

The frustoconical sealing surfaces 8 and 8' cooperating with the sealing surfaces 7 and 7' serve to ensure the seal between a transverse annular passageway 15 onto which open the two fuel passageways (not shown).

In the nozzle head 11, the start of the axial passageway 12 is subdivided into two divergent passageways 16 and 17.

Provided in the nozzle head 11 are, on one hand, a plurality of oxygen-fuel mixture passageways, one of which is shown at 18 and has a section which increases in the downstream direction in three steps 18a, 18b, 18c.

The smallest section 18a starts at the annular heating oxygen passageway 13, while the medium section 18b also receives, through a passageway 21, fuel gas which is aspirated into the passageway 18 by the suction effect resulting from the expansion of the heating oxygen owing to the increase in section, the whole being arranged in such manner as to obtain a complete normal combustion of the fuel.

The nozzle head 11 also has on its lower end surface an annular groove which forms, with the nozzle proper, an annular fuel passageway 22 which is connected to the annular fuel gas ring 15 through passageways 23 and 24.

The nozzle proper 30 has an upstream end surface which cooperates in a sealed manner, owing to the action of a nut 31' and with a correct radial position owing to the action of a key 39, with the corresponding end surface of the nozzle head 11. The nozzle proper 30 has in a transverse plane two cutting oxygen passageways 31, 32 each of which is in the form of a Laval nozzle 33, 34, the nozzle 34 having a section slightly larger than the section of the nozzle 33. The two passageways 31, 32 open out on the end surface 35 of the nozzle 30 by two circular outlets 36, 37 whose centres are aligned on a diameter of the nozzle 30.

An almost circular series of passageways 40 is arranged adjacent to the periphery of the nozzle and these passageways open out at 41 on the end surface 35 of the nozzle 30. These passageways 40 are connected to the various fuel mixture passageways 18.

Formed in the vicinity of a part of the periphery of the nozzle, in one of the extensions of the diametrical axis through the outlets 36 and 37 of the cutting oxygen passageways 31 and 32 and between the outlet 36 and the outlets 41, is a complementary plurality of heating passageways 44 which are arranged in a small part of an arc of a circle and open out at 45.

Located between the outlets 36 and 37 of the cutting oxygen passageways 31 and 32 is an outlet 46 of a fuel passageway 47 which is supplied by the fuel gas ring 22 through inclined passageways the dotted lines of one of which are shown at 48.

In operation, the nozzle, whose end surface 35 is at a distance of about 10 cm from the surface to be cut, is made to travel relative to the part to be cut in the diametrical direction from A to B (arrow F).

Thus, in a first stage which corresponds to the time shown at $T_1$ in FIG. 2, the part to be cut is subjected to a heating provided essentially by the large number of flames which issue at 41 and 45 from the passageways 40 and 44. This group of flames may be termed a frontal group of heating flames.

In the period $T_2$ following thereon and covering the passage of the cutting oxygen jets issuing from the outlets 36 and 37 of the cutting oxygen passageways 31 and 32 and the carburizing flame issuing from the passageway 47, there is a succession of cutting operations proper:

first of all, the cutting oxygen jet issuing from the outlet 36 forms a kerf through the part to be cut, the quality of which is very rough;

immediately after this rough kerf has been formed, the carburizing heating flame issuing from the outlet 46 of the passageway 47 and entrained by the two parallel oxygen cutting jets, penetrates the rough kerf and results in a particularly effective heating of the middle and the bottom of the kerf;

following on this heating, the second cutting oxygen jet issuing from the outlet 37 of the passageway 32 comes into action and effects a finishing operation on the kerf by imparting a particularly smooth aspect to the surface of the latter.

Throughout the period $T_2$, the heating flames issuing from the outlets 41 of the heating passageways heat the part laterally of the cutting oxygen jets.

As mentioned before, this cutting method permits attaining particularly high cutting speeds; thus, for example in the case of a 200 mm thick cold slab, it was possible to attain a cutting speed of 380 mm/min which is at least 20% higher than the maximum speeds employed at the present time.

Figure 3:
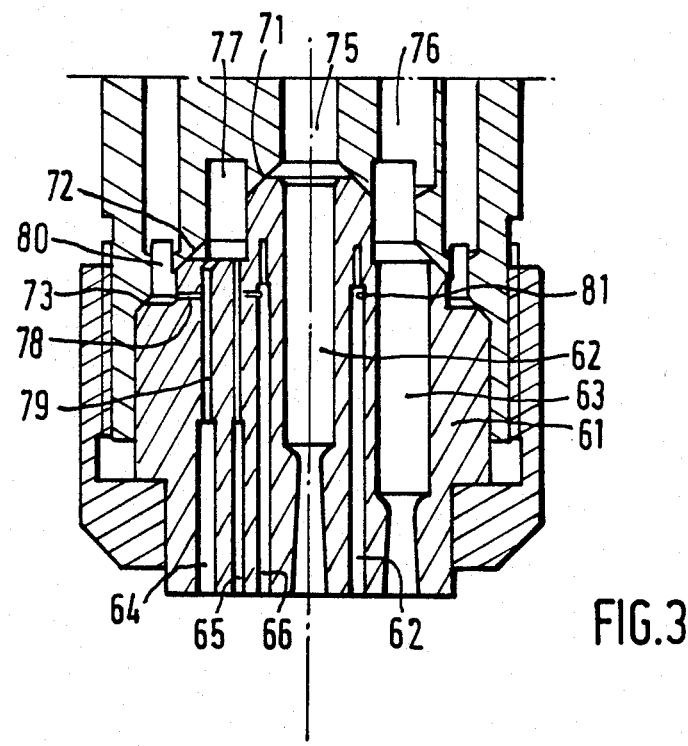
FIGS. 3 and 4, on one hand, and 5 and 6, on the other hand, are views similar to FIGS. 1 and 2 of two variants of the invention.
Figure 4:
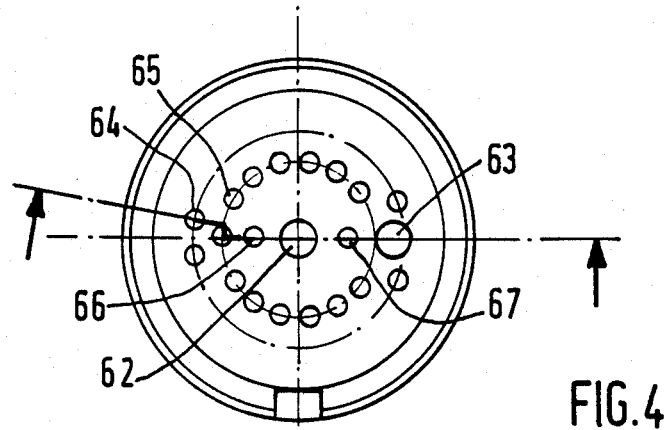

Reference will now be made to FIGS. 3 and 4 which represent a variant of the invention. Here, the cutting nozzle 61 is in one piece and comprises a plurality of passageways all of which extend in the longitudinal direction, namely two cutting oxygen passageways 62 and 63 (the passageway 63 being in fact supplied with heating oxygen at a pressure on the order of 6 to 8 bars), a plurality of heating flame passageways 64, 65, 66, and a carburizing flame passageway 67 provided between the cutting oxygen passageways 62 and 63.

The nozzle has sealing surfaces 71, 72, 73 which form with corresponding surfaces of the nozzle body 61 sealed connections of, firstly, the cutting oxygen passageway 62 with a first cutting oxygen supply passageway 75, and, secondly, the second cutting oxygen passageway 63 with a second cutting oxygen supply passageway 76, and, thirdly, the heating passageways 64, 65 and 66 with a heating oxygen ring 77 supplied by the second cutting oxygen passageway 76 and with an annular fuel passageway 80 through transverse fuel passageways 78 and 79, while the complementary heating passageway 67 is supplied through the transverse passageway 81 by the annular fuel passageway 80.

Figure 5:
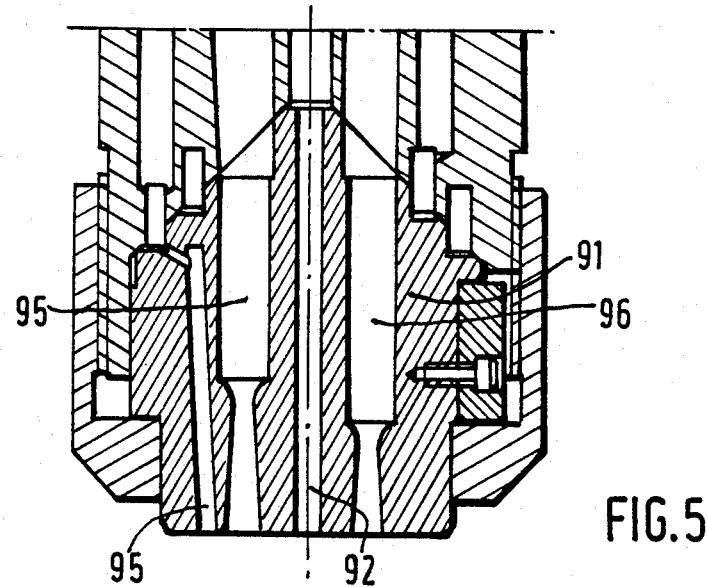
Figure 6:
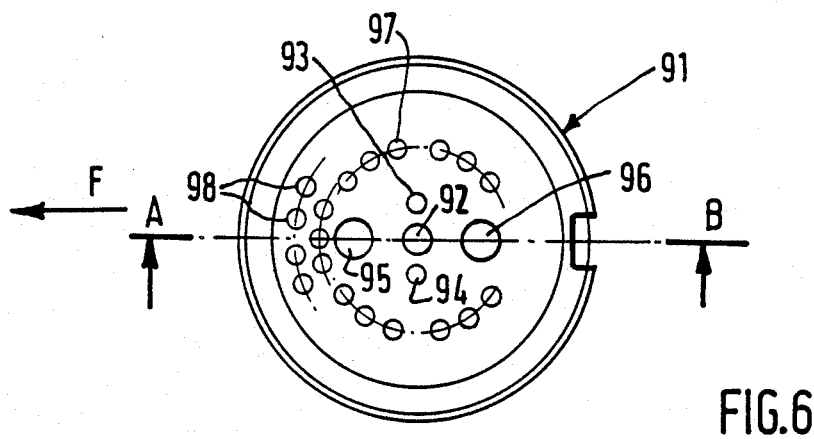

With reference to FIGS. 5 and 6, the single-piece nozzle 91 is characterized by a separate supply for the two cutting oxygen jets and here comprises an axial passageway 92 for a gas which may serve as a vector for the introduction of a product improving the cutting, while the deep-heating in the kerf is ensured by two neighbouring passageways 93 and 94. The cutting oxygen is conducted through two passageways 95, 96 on each side of the passageways 92, 93, 94. The heating passageways are here in the form of a almost circular series of first heating passageways 97 which is assisted by a few complementary passageways 98 in the front zone of the section on A B (arrow F).

It is also found that, in certain embodiments, it is of interest to provide an independent supply for the cutting oxygen jets which, owing to differentiated oxygen pressures, ensures an optimum operation.

The invention applies to the oxygen cutting of very thick sheets having a thickness of on the order of 150 mm to 400 mm; to the splitting of slabs in the cold state and/or to the oxygen cutting of cast metal following on a continuous hot casting.

We claim:

1. A method for the oxygen cutting of flat metal parts, comprising preheating the part to be cut by means of a plurality of heating flames arranged substantially transversely relative to a cutting line along which the oxygen cutting is effected, then bringing into action in succession a successive plurality of parallel cutting oxygen jets along said cutting line, a first of said cutting oxygen jets cutting a rough kerf in said part, and bringing into action between said first and a second of said cutting jets an intermediate flame for a deep reheating of said rough kerf, the second heating jet effecting a finishing cut.

2. A method according to claim 1, wherein the second cutting jet has a cross-section larger than the cross-section of the first cutting jet.

3. A method according to claim 1, comprising bringing into action after the preheating and simultaneously with the action of the cutting jets, a supplementary plurality of heating flames arranged in a double lateral extension on each side of said cutting line.

4. A cutting nozzle comprising a plurality of heating passageways for an oxygen-fuel mixture opening out in the vicinity of at least a part of a periphery of said nozzle, two cutting oxygen passageways opening out in directions parallel to each other from a central part of said nozzle to form cutting oxygen outlets, and an intermediate outlet of a fuel passageway between the outlets of the cutting oxygen passageways.

5. A cutting nozzle according to claim 4, wherein the outlet of the passageway for fuel between the two outlets of the cutting oxygen passageways is arranged directly on a straight line of alignment of the outlets of the cutting oxygen passageways.

6. A cutting nozzle according to claim 5, wherein the density of the outlets of the heating passageways is higher in the vicinity of one end of the straight line of alignment of the outlets of the cutting oxygen passageways.

7. A cutting nozzle according to claim 4, wherein the outlets of the heating passageways extend beyond a transverse peripheral zone substantially normal to a straight line of alignment of the outlets of the cutting oxygen passageways on each side of said straight line in a transverse region of said outlets of the cutting oxygen passageways and the intermediate passageway.

8. A cutting nozzle according to claim 7, comprising a row of outlets of heating passageways extending in an arc of a circle symmetrically on each side of the straight line of alignment of the outlets of the cutting oxygen passageways.

9. A cutting nozzle according to claim 5, wherein the two successive outlets of the cutting oxygen passageways are spaced 8 to 20 mm apart.

10. A cutting nozzle according to claim 4, further comprising in combination, a nozzle head having a generally frustoconical shape and a nozzle body connected to the nozzle head, and frustoconical sealing surfaces on the cutting nozzle and on the nozzle head sealingly interconnecting the cutting nozzle and the nozzle head.

11. A cutting nozzle according to claim 4, wherein the nozzle is in one piece and a nozzle body is directly connected to the nozzle by means of cooperative frustoconical bearing surfaces.

* * * * *